United States Patent
McIlvaine et al.

[15] 3,656,279
[45] Apr. 18, 1972

[54] GAS SCRUBBER

[72] Inventors: Robert L. McIlvaine, Glencoe; Roger E. Kent, Mount Prospect, both of Ill.

[73] Assignee: National Dust Collector Corporation, Skokie, Ill.

[22] Filed: Apr. 17, 1970

[21] Appl. No.: 29,497

[52] U.S. Cl....................................55/240, 55/257, 55/260
[51] Int. Cl.......................................................B01d 47/00
[58] Field of Search..................55/237, 238, 239, 240, 241, 55/260, 257, 220

[56] References Cited

UNITED STATES PATENTS

| | | | |
|---|---|---|---|
| 2,277,670 | 3/1942 | Weisgerber | 55/241 X |
| 2,757,597 | 8/1956 | Ward et al. | 55/257 X |
| 3,279,156 | 10/1966 | Wilhelmsson et al. | 55/241 X |
| 3,440,803 | 4/1969 | Wechseblatt | 55/241 |
| 3,473,298 | 10/1969 | Berman | 55/257 X |

*Primary Examiner*—S. Leon Bashore
*Assistant Examiner*—Robert L. Lindsay, Jr.
*Attorney*—Mason, Kolehmainen, Rathburn & Wyss

[57] ABSTRACT

A gas scrubber comprising a housing having an inlet and an outlet for gas, and a grid structure for introducing contaminant collecting scrubbing liquid into the gas flow. Said grid structure comprises a plurality of V-shaped, liquid troughs in spaced parallel array, having deflector vanes parallel and above the troughs and means for maintaining a relatively constant level of liquid in said troughs for distribution into the high velocity gas flow passing over and between adjacent troughs. Mechanical separator means is provided for removing contaminated scrubbing liquid from the gas after contaminants have agglomerated in the liquid from the gas.

13 Claims, 4 Drawing Figures

INVENTORS:
ROBERT L. McILVAINE
ROGER E. KENT
BY: *Mason, Kolehmainen, Rathburn & Wyss*
ATT'YS

PATENTED APR 18 1972

INVENTORS
ROBERT L. McILVAINE
ROGER E. KENT

BY: *Mason, Kolehmainey, Rathbury & Wyss*

ATT'YS

GAS SCRUBBER

The present invention relates to gas scrubbers, and more particularly relates to wet scrubbers of the gas-liquid contact type wherein contaminant collecting scrubbing liquid is introduced into the gas for collection and removal of contaminant particles and fume in the gas.

It is an object of the present invention to provide a new and improved gas scrubber which is highly efficient in collecting and removing contaminant particles and fume from industrial gases and the like.

Another object of the present invention is to provide a new and improved gas scrubber of the type described having new and improved means for agglomerating, collecting, and removing from the gas a high percentage of the contaminant particles contained therein, even though said particles have a widely variant range in size and weight.

Another object of the present invention is to provide a new and improved gas scrubber of the character described which is capable of efficiently collecting and removing contaminants from the gas with a minimum of energy required for operation and a minimum of scrubbing liquid per unit gas volume being required.

Another object of the present invention is to provide a new and improved gas scrubber of the character described having improved means for removing contaminated scrubbing liquid from the cleansed gas.

Another object of the present invention is to provide a new and improved gas scrubber of the character described which is extremely efficient in operation and capable of removing a high percentage of the contaminants including those ranging in size from 10 microns on down.

Another object of the present invention is to provide a new and improved gas scrubber of the character described including a grid structure comprising a plurality of parallel, spaced apart, V-shaped liquid troughs for introducing scrubbing liquid into the high velocity gas flow passing over and between the troughs.

Still another object of the present invention is to provide a new and improved gas scrubber which does not require the use of a relatively thick, difficult-to-clean filter medium or bed.

Another object of the present invention is to provide a new and improved gas scrubber which requires a minimum quantity of scrubbing liquid per unit volume of gas that is cleaned, yet is extremely efficient in removing the contaminants in the gas over a wide range of particle size.

These and other objects and advantages of the present invention are accomplished in an illustrated embodiment which comprises a gas scrubber including a housing having an inlet and an outlet and a grid structure comprising a plurality of parallel, spaced apart, elongated, V-shaped liquid troughs for introducing scrubbing liquid into the gas flow for intimate mixing with the gas as it flows over the troughs and through the spaces therebetween. Liquid separator means is provided for removing contaminated scrubbing liquid from the gas after the contaminants have agglomerated in the liquid. The gas scrubber of the present invention is extremely efficient in agglomerating, collecting, and removing contaminants, including particles ranging in size from 10 microns on down to submicron dimensions. The scrubber requires a minimum amount of energy for operation and a minimum flow rate of scrubbing liquid per unit volume of gas that is processed.

For a better understanding of the present invention, reference should be had to the following detailed description taken in conjunction with the drawings, in which.

Figure 1:
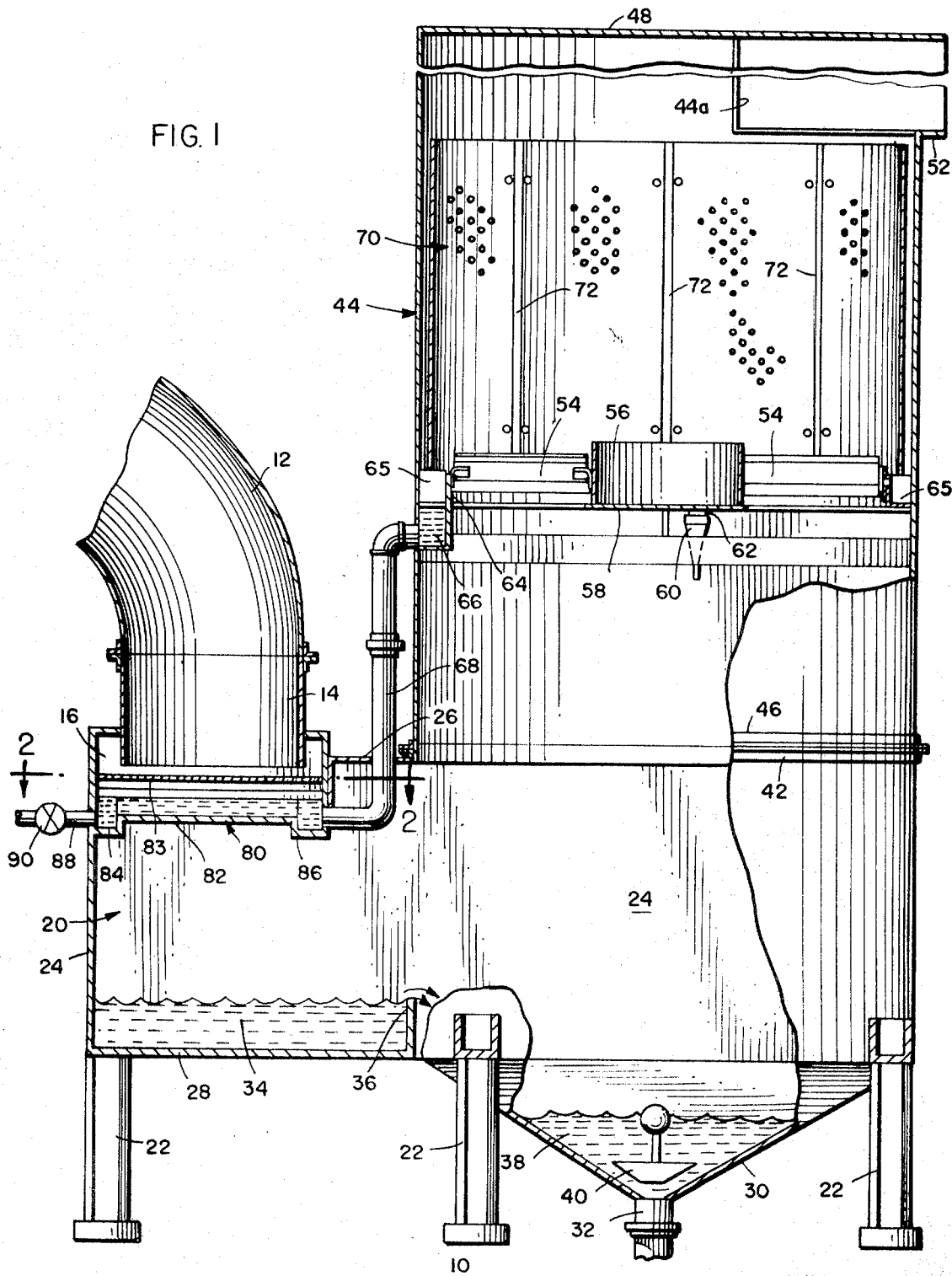
FIG. 1 is a vertical sectional view of a new and improved gas scrubber constructed in accordance with the features of the present invention.

Referring now, more particularly, to the drawings, therein is illustrated a new and improved gas scrubber 10 constructed in accordance with the features of the present invention and especially adapted for the efficient removal of contaminants, dust particles, fumes, and the like from industrial scrubber through an inlet elbow 12 for downward discharge through a vertical inlet duct section 14 into an inlet chamber 16. The inlet chamber is positioned in the upper portion of one end of a generally horizontally extending lower housing section 20 supported on a plurality of legs 22. The lower housing section 20 includes a peripheral, vertical sidewall 24, a top wall 26, a flat bottom wall section 28 below the inlet chamber 16, and a sump forming bottom section having panels 30 which slope downwardly toward a liquid drain line 32. A first liquid collecting sump 34 is formed below the inlet duct 14 by a dam member or weir 36, and liquid passing over the weir collects in a secondary drain sump 38. Because the sump 34 is positioned directly below the inlet duct section 14, the high velocity gas flow impinges directly on the surface of the liquid collected in the sump. This causes intense and continuous agitation and mixing action in the sump and the contaminant material in the liquid does not settle out to the bottom of the sump but is carried over the weir 36 with the liquid to the drain sump 38. The liquid collected in the sump 38 forms a liquid seal around the drain line 32 connected to the bottom of the housing, and suitable means, such as a float valve 40 is provided to maintain a relatively constant liquid level in the sump.

The top wall 26 of the lower housing section 20 is formed with a circular opening at the right-hand end (FIG. 1), which opening is encircled by an angle flange 42, which flange provides support for a cylindrical, upstanding separator housing section 44. The cylindrical housing section 44 is provided with an angular flange 46 for attachment to the flange 42 on the lower housing section 20 so that the separator section can be dismounted when desired.

The upper end of the separator housing is closed by a top wall 48, and clean gases are discharged from the scrubber through a rectangular-shaped discharge opening 44a and an outlet fitting 52.

Wetted gas from the lower housing section 20 is turned upwardly and flows up through a ring of radially extending swirl vanes 54 which are sloped with respect to the horizontal and which radiate outwardly from an inner support ring 56. A circular closure plate 58 is provided to close the area within the inner support ring 56 and a sock-type drain valve 60 is mounted on a drain pipe 62 mounted in a drain opening in the plate to drain off any liquid collected inside the inner ring. The outer ends of the swirl vanes 54 are supported by an outer ring 64 which forms the inside wall of an annular liquid collecting trough 65 around the interior of the housing wall 44. Liquid collected in the trough 65 is drained off into a sump 66 and a drain line 68 extends from the sump 66 to return the liquid to the inlet housing 16 in the lower housing section 20.

The wetted gas flowing upwardly through the annular ring of swirl vanes 54 is centrifuged radially outwardly toward the inside surface sidewall of the housing section 44. The liquid droplets, being much heavier than the gas, are centrifugally separated from the gas and collect on a perforated collection cylinder 70 spaced inwardly from the housing side-wall and in concentric relation therewith. The lower end of the collecting cylinder 70 is centered midway above the annular collection trough 65 in order to directly receive the liquid collected on the surface of the cylinder. Some of the liquid droplets centrifuged out of the swirling gas stream impinge directly upon the inside surface of the perforated collection cylinder 70 and eventually gravitate downwardly while growing in size and fall into the collection trough 65. Many of the liquid droplets, however, pass through the perforations in the collection cylinder 70 and collect on the outside surface thereof or collect on the inside surface of the housing sidewall. These droplets also gravitate downwardly toward the liquid collection trough 43 and have less tendency to migrate upwardly with the gas stream because of the shelter afforded by the perforated cylinder. The liquid droplets entrapped in the region or annular space between the perforated collection cylinder and the housing sidewall are somewhat immune to the lifting effects of the upwardly swirling high velocity gas stream flowing on the inside of the collection cylinder, and this results in a highly efficient removal and collection of liquid droplets. The gas minus the liquid droplets removed by centrifugal action passes above the perforated collection cylinder 70 and exits the housing 44 through the outlet fitting 52 in a clean and dry condition.

The collection cylinder 70 comprises a plurality of perforated plates, each of which conforms to a longitudinal fractional segment of a cylinder. The plates are assembled together into a perforated cylinder or cagelike structure which is mounted in concentric alignment within the outer, cylindrical wall of the housing section 44. Each perforated plate 160 is removably supported on a pair of vertically extending, parallel, ribs 72 of T-shaped cross-section with a middle flange or leg welded or otherwise secured to the inside surface of the housing section 44. The perforated plates are attached to the lateral flanges of the ribs with bolts or other fasteners so that each perforated plate may be removed for cleaning or replacement.

The number, size, and pattern of perforations in the plates making up the collection cylinder 70 are arranged to readily permit the outward flow of liquid mist and droplets while at the same time presenting a false wall or liner for containing the upwardly swirling gases. The liquid droplets are centrifuged outwardly through the perforations in the cylinder 70 and are then partially hidden from the action of the gas stream spiraling upwardly in the housing.

A common problem encountered with prior rotary vane-type demisting assemblies is that as the water droplets are centrifuged outwardly and collected on the surface of the housing wall, sometimes the droplets (instead of moving downwardly and collecting in the liquid trough) migrate upwardly under the influence of the upwardly spiraling gas stream and eventually this moisture is recombined with gas and is carried out through the exhaust outlet.

The perforated collection cylinder 70 of the present invention provides a false wall which tends to hide the liquid droplets from the effect of the upwardly spiraling gas stream, and the droplets then collect and run freely down the wall of the housing section 44 and are collected in the annular collecting trough 65.

Some of the liquid may collect in the central portion of the housing above the circular wall 58 within the inner support ring 56. The short drainpipe 62 with the collapsible, rubber, stock-type valve member 60 on the lower end thereof is provided for periodically removing this liquid and dispensing the liquid downwardly into the lower section 20 of the scrubber housing in a large enough stream or quantity so that the liquid is not carried back upwardly by the buoyancy of the gas stream. The sock-type valve 60 functions to open after a sufficient amount of liquid is collected and corresponding head of water pressure is applied, and the valve only opens periodically.

Figure 2:
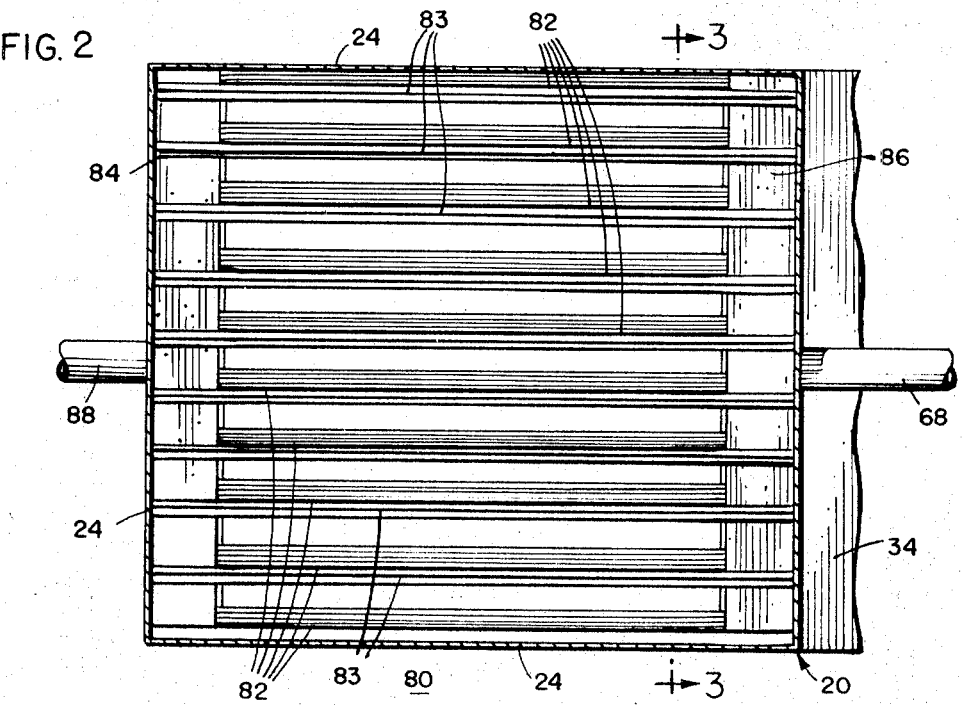
FIG. 2 is a horizontal plan view in section taken substantially along line 2—2 of FIG. 1 and showing the grid structure of liquid troughs.
Figure 3:
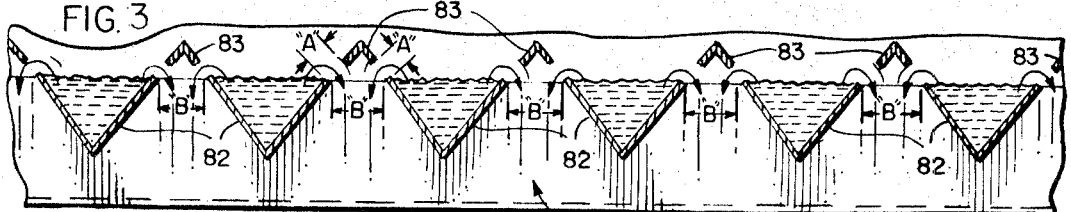
FIG. 3 is a fragmentary vertical sectional view taken substantially along line 3—3 of FIG. 2.

In accordance with the present invention, a grid structure 80 (best shown in FIGS. 2 and 3) is extended across the lower end portion of the inlet housing 16 for the purpose of introducing scrubbing liquid and accelerating the gas to high velocity as it flows downwardly into the housing section 20 from the inlet fitting 14. The grid structure comprises a plurality of elongated, liquid troughs 82 of V-shaped cross section and arranged in spaced apart, parallel array between a pair of liquid supply troughs 84 and 86 at opposite ends. The liquid removed from the gas by the action of the swirl vanes 54 is returned to the supply trough 86 through the drain line 68 and fresh or make-up liquid is supplied to the system through a supply line 88 and valve 90.

Figure 4:
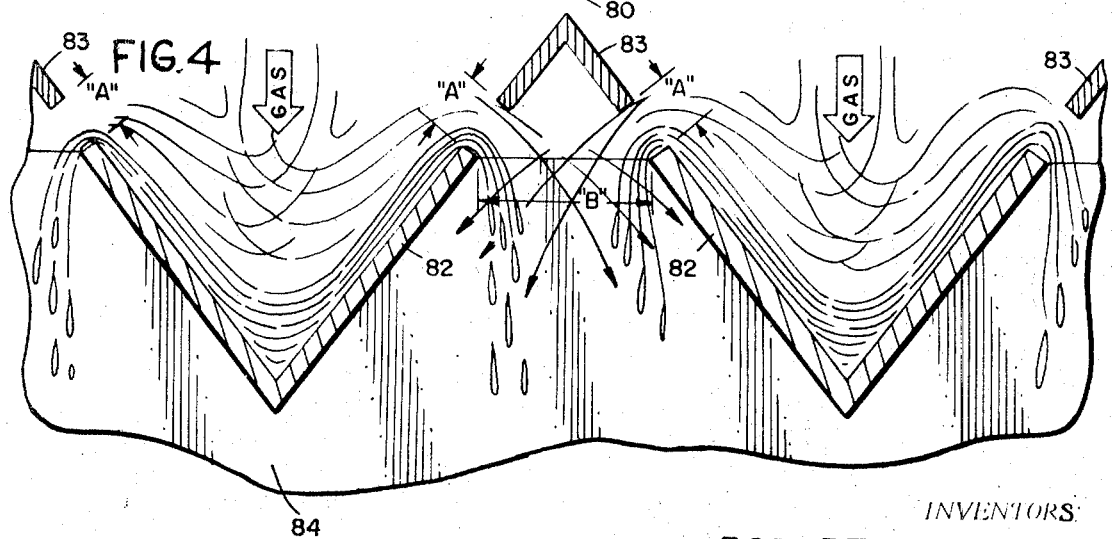
FIG. 4 is an enlarged fragmentary vertical sectional view similar to FIG. 3 showing in somewhat schematic form the interaction of the gas flow and the liquid in the troughs during operation of the scrubber.

FIG. 4 illustrates the condition of the liquid in the troughs 82 during operation of the scrubber. The downwardly flowing gas depresses the liquid toward the bottom or apex of the troughs and forces the liquid to climb up the sloped trough sidewalls toward the upper edge. As the liquid reaches the upper edges of the trough sidewalls and begins to spill over, the high velocity gas stream acts to literally tear the liquid into small droplets which are intimately mixed into the gas flow. Because the liquid area confronting the downwardly flowing gas stream in the inlet chamber 16 is about 60 percent or a greater percentage of the total cross-sectional flow area of the inlet chamber, excellent wetting action is obtained because of the relatively large liquid-gas contact area. The area of liquid-gas contact is increased substantially by the fact that the gas aligned with the apexes of the troughs is diverted laterally outwardly and upwardly along the sloped trough sidewalls towards the upper edges thereof. As the liquid reaches the upper edges of the trough sidewalls, it is literally torn apart into small droplets by the high velocity gas flow and, accordingly, excellent mixing action is obtained.

In accordance with the invention, a plurality of parallel deflector vanes 83 comprising elongated angles are positioned above the open spaces between adjacent pairs of liquid troughs 82. The deflector vanes are arranged with the lower edges of their flanges spaced upwardly above the upper edges of the troughs to define slots or openings having a width "A" through which the gases must flow. The slots or passages defined between the lower edges of the deflector angle flanges and the upper edges of the liquid trough sidewalls form venturilike throats or passageways of a width "A" for accelerating the gas and liquid droplets entrained therein to a maximum value. As shown in FIG. 4, between each pair of adjacent liquid troughs 82, a slot or passage of width "B" is formed, and the dimension "B" is made greater than double the value of dimension "A" to permit expansion of the gas and a reduction of flow velocity as it moves downwardly between the expanding passageways defined between the liquid troughs 82. The gas flowing off the liquid surface of one liquid trough impinges directly upon the flow coming from the adjacent trough beneath a deflector angle 83, and intense mixing and turbulence are thereby achieved in the region of highest velocity around the slots or passageways "A." Downstream of the slots "A," the gas decelerates and expands because each slot "B" has a flow area greater than that of the pair of slots "A," which feed the gas flow thereto. The divergent sidewalls of the liquid troughs form the equivalent of the expansion portion of a venturi nozzle and the minimum area region defining the slots "A" is the equivalent of the venturi throat.

The trough sidewalls are sloped at approximately 45° with respect to the horizontal, and it has been found that this angular arrangement between the vertically downward direction of the gas flow and the sloped upward direction of liquid travel toward the upper edge of the trough sidewalls provides for excellent mixing and blending of small liquid droplets with the gas flow. Division of the liquid into small size droplets and particles is desirable for collecting similarly sized contaminants or dust particles and the better and more intimate mixing action or blending that is achieved results in higher collection efficiencies. The gridlike arrangement of the V-shpaed troughs provides for a higher liquid-gas contact area and provides for a better breakdown of the liquid into smaller sized droplets. In addition, the action of the high velocity gas flow in literally tearing the liquid into droplets along the upper edges of the troughs is an important factor in obtaining better division and dispersion of liquid droplets in the gas stream.

It has been found that the addition of the angle deflector vanes 83 above the spaces between adjacent pairs of liquid troughs 82 to define the venturi throats (slots "A") increases the collection efficiency of the scrubber and makes the scrubber efficiency less sensitive to changes in operating pressure. The venturilike passageways formed by the spaced sidewalls of the troughs 82 provide for excellent and highly turbulent mixing of the liquid and gas, and it has been found that if the total area of the slots "B" is approximately 40 percent or less of the cross-sectional flow area of the inlet section 14, excellent collection efficiencies are obtained without an excessive operating pressure drop. The deflector vanes 83 cause abrupt changes in the flow direction of the gas as it moves downwardly through the grid structure 80, and this factor, coupled with the flow restriction causing acceleration of the gas flowing through the slots "A," contributes to the highly efficient scrubber operation. The open spaces "B" between upper edges of the liquid troughs 82 comprise a total flow area of about 40 percent of the cross section of the inlet duct 14 or entire grid structure 80. The remaining 60 percent of the area comprises the surface area of liquid in the troughs so that excellent wetting action is obtained.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. Apparatus for scrubbing gas with a liquid for collecting contaminants therefrom comprising vertical flow passage means, a plurality of elongated, liquid holding troughs disposed in spaced apart, parallel, horizontal array across said flow passage means, said troughs having sharp upper edges forming spillways for liquid flow sucked into said gas flow in the spaces between upper edges of adjacent troughs, said troughs having upper edge wall portions sloping oppositely outwardly from the center of the troughs and dimensioned to provide an unobstructed upper liquid surface area of approximately 60 percent of the total cross-sectional area of said flow passage means normal to said vertical gas flow; a second grid structure comprising a plurality of elongated, spaced apart, deflector vanes parallel to said troughs and disposed above the spaces between adjacent pairs of troughs for defining minimum area passageways for said gas as it moves generally vertically through said grid structures; means for supplying liquid to said troughs from supply ends thereof, control means for maintaining a desired level of liquid in said troughs; liquid sump means downstream of said array for collecting contaminated liquid; and separator means downstream of said array for separating liquid droplets from said gas.

2. The gas scrubbing apparatus of claim 1 wherein said separator means comprises an array of sloped vanes arranged in a radial pattern around a common axis for directing said gas in an upwardly spiralling stream outwardly toward a cylindrical surface for collecting liquid droplets therefrom.

3. The gas scrubbing apparatus of claim 1 including an elongated housing section having liquid sump means defined in the lower portion thereof, said liquid troughs being mounted in said housing above said sump means, inlet means for directing gas flow into said housing section downwardly onto said troughs, said separator means including an upright housing in communication with said housing section and laterally offset from said inlet means.

4. The apparatus of claim 1 including a feeder trough disposed at the supply ends of said troughs for supplying liquid to the same, and return means connected between said separator means and said feeder trough for returning separated liquid thereto.

5. The apparatus of claim 4 including make-up supply means connected to a feeder trough adjacent opposite ends of said troughs to provide a supply of liquid to the same.

6. The apparatus of claim 1 wherein said troughs are V-shaped in cross section and have sidewalls arranged at approximately a 45° angle to the general direction of gas flow between adjacent troughs.

7. The apparatus of claim 1 wherein said troughs are spaced to provide a confronting liquid surface to the vertically flowing gas in said passage means of at least one-half of the cross-sectional flow area of said vertical gas flow passage means.

8. Apparatus for scrubbing gas with a liquid for collecting contaminants therefrom comprising a first grid structure having a plurality of elongated, liquid holding troughs disposed in spaced apart, parallel, horizontal array across a vertical flow path of said gas, said troughs having sharp upper edges forming spillways for liquid flow sucked into said gas flow in the spaces between upper edges of adjacent troughs, said troughs having upper edge wall portions sloping oppositely outwardly from the center of the troughs and dimensioned to provide an unobstructed upper liquid surface area of approximately 60 percent of the total cross-sectional area of said flow passage means normal to said vertical gas flow; a second grid structure comprising a plurality of elongated, spaced apart, deflector vanes parallel to said troughs and disposed above the spaces between adjacent pairs of troughs for defining minimum area passageways for said gas as it moves generally vertically through said grid structures; means for feeding liquid to the supply ends of said troughs, control means for maintaining a selected level of liquid in said troughs; liquid sump means downstream of said array for collecting contaminated liquid; and separator means downstream of said array for separating liquid droplets from said gas.

9. The gas scrubber of claim 8 wherein said deflector vanes comprise elongated angles centered between pairs of adjacent liquid troughs.

10. The gas scrubber of claim 8 including a feeder trough connecting supply ends of said troughs for supporting the same and supplying liquid thereto.

11. The gas scrubber of claim 9 wherein said deflector vanes have downwardly sloping flanges with lower edges spaced above upper edges of said liquid troughs to define minimum cross-sectional flow areas therebetween.

12. The gas scrubber of claim 11 wherein each deflector vane defines a pair of minimum cross-sectional flow areas along the lower edges of the flanges thereof, the sum of said flow areas being less than the open space directly between pairs of adjacent liquid troughs.

13. The gas scrubber of claim 12 wherein the area of open space defined between said troughs is less than the surface area of liquid in said troughs.

* * * * *